United States Patent
Grant et al.

(10) Patent No.: US 8,798,119 B2
(45) Date of Patent: Aug. 5, 2014

(54) SYMBOL-LEVEL CODE-SPECIFIC JOINT DETECTION FOR CDMA RECEIVERS

(75) Inventors: Stephen Grant, Pleasanton, CA (US); Michael Samuel Bebawy, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 160 days.

(21) Appl. No.: 13/468,694

(22) Filed: May 10, 2012

(65) Prior Publication Data

US 2013/0301687 A1  Nov. 14, 2013

(51) Int. Cl.
  *H04B 1/00*  (2006.01)
(52) U.S. Cl.
  USPC ...................... 375/148; 375/E1.02
(58) Field of Classification Search
  None
  See application file for complete search history.

(56) References Cited

U.S. PATENT DOCUMENTS

| | | | |
|---|---|---|---|
| 7,609,754 B2 * | 10/2009 | Fulghum | 375/148 |
| 7,668,227 B2 * | 2/2010 | Grant et al. | 375/148 |
| 8,126,043 B2 * | 2/2012 | Bottomley et al. | 375/229 |
| 2005/0111528 A1 * | 5/2005 | Fulghum et al. | 375/148 |
| 2009/0213907 A1 * | 8/2009 | Bottomley et al. | 375/148 |
| 2010/0020854 A1 * | 1/2010 | He et al. | 375/148 |
| 2011/0075767 A1 | 3/2011 | Bottomley et al. | |

OTHER PUBLICATIONS

Damen, M. O. et al. "On Maximum-Likelihood Detection and the Search for the Closest Lattice Point." IEEE Transactions on Information Theory, vol. 49, No. 10, Oct. 2003.
De Jong, Y. L. C. et al. "Iterative Tree Search Detection for MIMO Wireless Systems." IEEE Transactions on Communications, vol. 53, No. 6, Jun. 2005.
Samuel, M. et al. "Geometric Decoding of PAM and QAM Lattices." IEEE Global Telecommunications Conference, 2007 (GLOBECOM '07), Nov. 26-30, 2007.
Verdu, S. Multiuser Detection. Cambridge University Press, Cambridge, UK, pp. 154-161, 1998.

* cited by examiner

*Primary Examiner* — Chieh M Fan
*Assistant Examiner* — Bahman Badipour
(74) *Attorney, Agent, or Firm* — Murphy, Bilak & Homiller, PLLC

(57) ABSTRACT

Techniques are disclosed for processing a received spread spectrum signal containing multiple signals of interest and one or more interfering signals with known spreading codes. An example method begins with the generation of a despread signal vector for each signal of interest, for a given symbol time, using a corresponding group of correlators for each of the signals of interest. The method continues with the calculating of a covariance matrix for the given symbol time, the covariance matrix representing impairment correlations among the correlators from sources other than the signals of interest, as well as from inter-symbol interference in and among the signals of interest. The covariance matrix includes diagonal blocks that each represent impairment correlations among a single one of the groups of correlators; the diagonal blocks are calculated based on first terms that account in a code-specific manner for same-symbol-time interference from each of the interfering signals.

18 Claims, 4 Drawing Sheets

SYMBOL-LEVEL CODE-SPECIFIC JOINT DETECTION FOR CDMA RECEIVERS

BACKGROUND

The present invention generally relates to wireless communications receivers, and more particularly relates to techniques for processing received spread spectrum signals containing two or more signals of interest.

In wireless communication systems that use Code-Division Multiple Access (CDMA) technology, the dispersive nature of the propagation channel often leads to a loss of orthogonality between signals that are transmitted using different channelization codes. As a result, after the signals are despread by the CDMA receiver, the code-separated signals leak into one another's symbol estimates, giving rise to multi-user interference (MUI) between the codes.

A traditional technique used to mitigate the MUI problem is to perform linear equalization, whereby the effect of the dispersive channel is partially undone. This process at least partially restores orthogonality between a signal of interest and other signals transmitted using different channelization codes. However, because these techniques are based on inverting the propagation channel, which generally conflicts with the goal of avoiding noise enhancement, the equalization process cannot typically fully restore orthogonality.

Another known approach for addressing inter-code MUI is to perform joint demodulation or maximum-likelihood detection (MLD) over the set of parallel codes to be received. Significant performance gains have been demonstrated using joint demodulation. The joint demodulation metric actually exploits the code leakage products, thus they no longer constitute a performance impediment.

Symbol-level joint demodulation is considered in U.S. Pat. No. 7,668,227, issued 23 Feb. 2011 ("the '227 patent"), and in U.S. Patent Application Publication No. 2011/0075767, published 31 Mar. 2011 ("the '767 Publication). The entire contents of each of the '227 patent and the '767 Publication are incorporated herein by reference, as each describes apparatus and techniques suitable for modification according to the techniques described herein.

These references describe approaches in which a received signal is first despread to obtain symbol estimates at different time lags. The despread values at the different delays are then linearly combined to suppress interference terms not included in joint demodulation. Finally, joint demodulation of the parallel codes of interest is performed. In the '227 patent, all of the codes of interest are jointly detected at once, resulting in a single-stage structure referred to as code-specific joint detection generalized Rake (CS-joint demodulation-GRake). In the '767 Publication, a multi-stage structure is employed in which joint demodulation is performed on smaller groups of codes in each stage and a restricted number of candidates is maintained from stage-to-stage in order to reduce complexity.

In both the '227 patent and the '767 Publication, code-specific equalizer weights are used to account for the post-despreading code leakage structure. The code-specific processing accounts for the time-variant spreading waveform, which arises from the fact that the long scrambling code is much longer than a single information symbol and thus changes from one symbol period to the next. Code-specific processing is also considered in U.S. Patent Application Publication 2005/0111528, published 26 May 2005 ("the '528 Publication), the entire contents of which are also incorporated herein by reference. In the system described in the '528 Publication, however, only one symbol is detected at a time when linear equalization is used.

One shortcoming of several approaches to symbol-level joint demodulation is inferior performance in the presence of interference from overhead channels. Especially in the context of the demodulation of high-speed data channels, "overhead" channels are generally understood to include pilots, control channels, and/or dedicated channels, e.g., voice. In the discussion that follows, however, in the context of a particular joint demodulation process the term "overhead" is meant to refer to any channels or signals other than the signals that are jointly demodulated in the process, and thus can also include data signals that are intended for the receiver of interest but that are not subjects of the particular joint demodulation process. In the presence of such overhead, code leakage from the overhead codes to the subject signals of a demodulation process can severely hamper demodulation performance. In extreme situations, especially where a large proportion of the total signal power is allocated to overhead channels, the achievable throughput of a wireless system may be severely hampered. Accordingly, improved techniques for processing received spread spectrum signals containing two or more signals of interest and one or more interfering signals are needed.

SUMMARY

A source of problems with previous approaches is that code leakage between the overhead and data codes is not accurately modeled in the formulation of the receiver's equalizer weights. Specifically, the code-specific nature of the impairments is not fully accounted for. In some previously known techniques, the code-specific nature of the impairments is averaged out when formulating the receiver's equalizer weights. These approximations and simplifications create inaccuracies that lead to inferior receiver performance.

In several embodiments of the present invention, in contrast, the code leakage between all codes, data and overhead, is modeled in an accurate manner, using techniques that allow for efficient implementation in digital signal processing circuits. In some of these embodiments, the correlation of the impairment process (interference and noise) observed at the outputs of the despreaders allocated to pairs of spreading codes is accounted for exactly, using terms that account for the code-specific nature of the impairments. In other embodiments described below, the code-specific nature of the impairment is modeled approximately. Both approaches offer a significant improvement in performance compared to prior techniques in which the code-specific nature of the impairment is treated less accurately.

The techniques described in detail below include several methods for processing a received spread spectrum signal containing two or more signals of interest and one or more interfering signals with known spreading codes. An example method begins with the generation of a despread signal vector for each signal of interest, for a given symbol time, using a circuit that includes a corresponding group of correlators for each of the signals of interest. The method continues with the calculating of a covariance matrix for the given symbol time. This covariance matrix represents impairment correlations among the correlators from sources other than the signals of interest, as well as from inter-symbol interference in and among the signals of interest. In particular, the covariance matrix includes diagonal blocks that each represent impairment correlations among a single one of the groups of correlators. In each of several embodiments, these diagonal blocks are calculated based on first terms that account in a code-specific manner for same-symbol-time interference from each of the interfering signals.

In some embodiments, the calculation of the covariance matrix, for at least the diagonal blocks, is based further on second terms that account in a code-specific manner for inter-symbol interference from each of the interfering signals. In some of these embodiments, these second terms further account in a code-specific manner for inter-symbol impairments from among the signals of interest. In other embodiments, the calculating of at least the diagonal blocks is further based instead on second terms that account in a code-averaged manner for inter-symbol interference from the interfering signals and from among the signals of interest.

In a variant of any of the above embodiments, the calculation of the covariance matrix further comprises computing a plurality of off-diagonal blocks of the impairment covariance matrix, wherein each off-diagonal block represents impairment correlations between correlators from a corresponding pair of the groups of correlators, and wherein said computing of the off-diagonal blocks is based on terms that account in a code-specific manner for same-symbol-time interference from each of the interfering signals.

The methods summarized above can be combined with other receiver processes to provide improved receiver performance. Thus, for example, several methods according to the present invention continue with the computation of an interference-suppressing combining weight matrix, using the covariance matrix and a code-specific channel response matrix. Next, the combining weight matrix is applied to the despread signal vector, to yield an an interference-reduced decision statistic vector for the given symbol time. The interference-reduced decision statistic vector computed in this operation comprises a single complex value for each of the signals of interest. Then, a symbol value, or soft bit values, or both, are estimated for at least one of the signals of interest from the interference-reduced decision statistic vector, for the given symbol time, using a non-linear detection process that accounts for code-specific leakage between the signals of interest.

Any of a variety of non-linear processes can be used to estimate the desired signals, including joint demodulation techniques, parallel interference cancellation techniques, etc. In some embodiments, for example, the estimating of the desired signal symbols begins with the computing of an unconstrained least-squares estimate of a desired symbol vector for the signals of interest, for the given symbol time, based on the reduced-interference decision statistic vector. A tree search is then performed, to jointly detect symbols for the signals of interest. In some of these embodiments, the tree search is a breadth-first constrained tree search, or a depth-first constrained tree search, or a combination of both. Examples include a reduced complexity tree search approach selected from a group consisting of: an m-algorithm search; a sphere-decoding search; a geometric-decoding search; and a multi-stage group detection (MSGD) search.

Embodiments of the present invention further include receiver circuits configured to carry out one or more of the methods described above. An example receiver circuit according to several embodiments of the invention includes a despreading circuit, which in turn includes a group of correlators for each of the signals of interest, where each group of correlators is configured to generate a despread signal vector for a corresponding signal of interest, for a given symbol time. The receiver circuit further includes an impairment covariance estimation circuit configured to calculate a covariance matrix for the given symbol time, the covariance matrix representing impairment correlations among the correlators from sources other than the signals of interest as well as from inter-symbol interference in and among the signals of interest. The covariance matrix computed by the impairment covariance estimation circuit includes diagonal blocks, which each represent impairment correlations among a single one of the groups of correlators. The impairment covariance estimation circuit is configured to calculate at least the diagonal blocks of the covariance matrix based on first terms that account in a code-specific manner for same-symbol-time interference to the desired signals from each of the interfering signals. Several variants of this covariance matrix calculation are described in detail in the description that follows.

The impairment covariance estimation circuit and despreading circuit summarized above can be combined with other receiver circuits to provide improved receiver performance. In some embodiments, for example, a receiver circuit that includes an impairment covariance estimation circuit and despreading circuit as detailed above further includes a combining weight computation circuit configured to compute an interference-suppressing combining weight matrix based on the covariance matrix and a code-specific channel response matrix, as well as an equalizing combiner circuit configured to compute an interference-reduced decision statistic vector for the given symbol time from the combining weight matrix and the despread signal vectors. The interference-reduced decision statistic vector produced by the combiner circuit comprises a single complex value for each of the signals of interest for the given symbol time. The receiver circuit in several of these embodiments still further includes a signal detection circuit configured to estimate a symbol value, or soft bit values, or both, for at least one of the signals of interest from the interference-reduced decision statistic vector, for the given symbol time, using a non-linear detection process that accounts for code-specific leakage between the signals of interest.

The methods and circuits summarized above can provide improved demodulation performance compared to prior techniques, especially in the presence of interference from overhead channels. The improved performance is due directly to the more accurate modeling of the impairment both within and between the data/overhead codes. The improved demodulation performance translates directly into improved data rates and/or throughput for the users of communication devices configured according to these techniques.

Of course, the present invention is not limited to the above-summarized features and advantages. Indeed, those skilled in the art will recognize additional features and advantages upon reading the following detailed description, and upon viewing the accompanying drawings.

DETAILED DESCRIPTION

Figure 1:
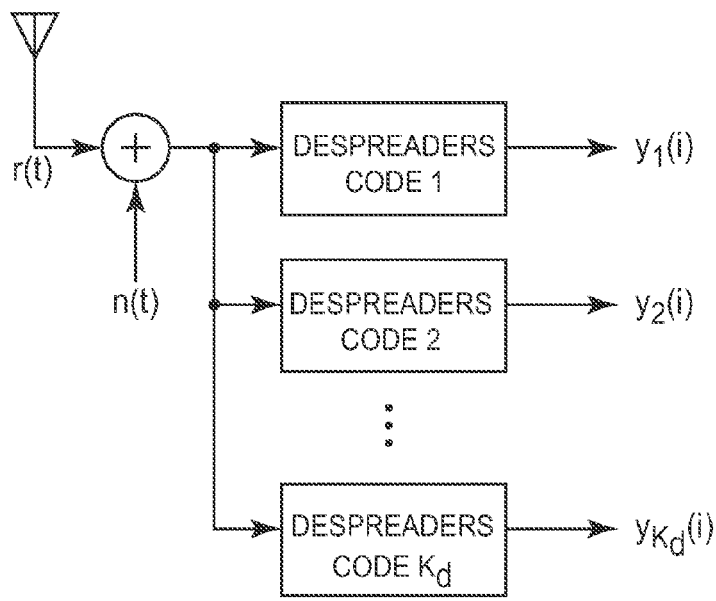
FIG. 1 illustrates the generation of a despread vector for each of several code-separated signals of interest.

The invention is described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Thus, components or features from one embodiment may be assumed to be present or used in another embodiment, where such inclusion is suitable.

For purposes of illustration and explanation only, these and other embodiments of the present invention are described herein in the context of operating in a radio access network (RAN) that communicates over radio communication channels with wireless terminals (also referred to as user equipment, or "UEs"). More particularly, specific embodiments are described in the context of systems using High-Speed Packet Access (HSPA) technology, as standardized by the membership of the $3^{rd}$ Generation Partnership Project (3GPP). It will be understood, however, that the present invention is not limited to such embodiments and may be embodied generally in various types of communication networks. As used herein, the terms mobile terminal, wireless terminal, or UE can refer to any device that receives data from a communication network, and may include, but are not limited to, a mobile telephone ("cellular" telephone), laptop/portable computer, pocket computer, hand-held computer, and/or desktop computer.

Also note that the use of terminology such as "base station" (which may be referred to in various contexts as NodeB, eNodeB, or Evolved Node B) and "wireless terminal" (often referred to as "UE" or "User Equipment") should be considering non-limiting and does not necessarily imply a certain hierarchical relation between two particular nodes of a communication link. In general, a base station (e.g., a "NodeB") and a wireless terminal (e.g., a "UE") may be considered as examples of respective different communications devices that communicate with each other over a wireless radio channel. While embodiments discussed herein may focus on wireless transmissions in a downlink from a NodeB to a UE, embodiments of the invention may also be applied, for example, in the uplink.

One shortcoming of several known approaches to symbol-level joint demodulation in CDMA systems is inferior performance in the presence of interference from overhead channels. These overhead channels can include, for example, pilot signals, control channels, and/or dedicated channels, such as voice. In the presence of such overhead, code leakage from the overhead codes to data codes can severely hamper performance. In extreme cases, where a large proportion of the transmitted is allocated to overhead signals, the achievable throughput may be severely hampered.

A major source of problems with previous approaches is that the code leakage between the overhead and data codes is not accurately modeled in the formulation of the receiver's equalizer weights. Specifically, the code-specific nature of the impairments (interference and noise) to the signals of interest is not fully accounted for. In other words, the correlations between the impairment at the despreader outputs corresponding to pairs of data codes are ignored. Moreover, only the code leakage among the signals of interest is accounted for; not that between the data and overhead codes. In some previously known techniques, the code-specific nature of the impairments is averaged when formulating the receiver's equalizer weights. These approximations and simplifications create inaccuracies that lead to inferior receiver performance.

In several embodiments of the invention, in contrast, the code leakage between all codes, data and overhead, is modeled in an accurate manner, using techniques that allow for efficient implementation in digital signal processing circuits. In some of these embodiments, the correlation of the impairment process (interference and noise) observed at the outputs of the despreaders allocated to pairs of spreading codes is accounted for exactly, using terms that account for the code-specific nature of the impairments. This technique is referred to in the discussion that follows as the "Full CS" approach, as it accounts for impairments caused by inter-symbol-interference and by overhead signals in code-specific terms. In other embodiments described below, the code-specific nature of the impairment is modeled approximately, in an approach referred to herein as "Partial CS." Both approaches offer a significant improvement in performance compared to prior techniques in which the code-specific nature of the impairment is treated inaccurately.

In the detailed discussion that follows, various aspects of the present invention are described in the context of a High-Speed Packet Access downlink, as specified by 3GPP. More particularly, the mathematical justification for the techniques of the present invention are presented for the case of a single transmit antenna, i.e., for a case in which no transmit diversity or multi-input multi-output (MIMO) technologies are employed. However, it will be appreciated by those familiar with these advanced technologies that the inventive techniques disclosed herein are equally applicable in systems employing these technologies, and that the mathematical justification and calculations presented below may be readily extended to cover a wide range of signal scenarios.

With that in mind, a signal model for the HSPA downlink scenario is formulated as follows. First, it should be noted that the terms "desired signals" and "signals of interest" may be used interchangeably in the discussion that follows to refer to the signals of interest for a particular demodulation process. Likewise, the term "overhead signals" is meant to refer to any channels or signals other than the signals that are jointly demodulated in a particular demodulation process, and thus can also include data signals that are intended for the receiver of interest but that are not subjects of the particular joint demodulation process. Still further, the term "demodulation" as used herein should be understood in its broadest sense to refer to the process of extracting an estimate of the original information signal from a received modulation signal, which in some cases is called "detection," whether that process yields soft or hard symbol values or soft or hard bit values, and whether or not the process yields fully decoded bit values or bit values or symbol values that have yet to be decoded.

Returning to the details of the signal model, the total number of transmitted codes, for both the signals of interest and overhead signals is given as K. The number of codes allocated to the high-speed downlink shared channel (HS-PDSCH) is denoted $K_d$, where the subscript 'd' indicates that these are the desired codes (data codes) that will be jointly detected. The spreading factor for the data codes is N=16. The $K-K_d$ remaining codes are considered as overhead, typically allocated to control channels and pilots, and may have a different spreading factor, such as 256. It is assumed that the same number of correlators ("fingers"), Q, is used to despread each of the desired codes. For example, in the often studied Case 3 channel with a single receive antenna, a typical value might be Q=8. For the case of a large code allocation, e.g., $K_d$=15, this results in a total of $K_dQ$=120 fingers for data code despreading.

FIG. 1 shows the generation of the length-Q despread vector $y_k(i)$ for each of the codes of interest, k=1 ... $K_d$, where the time index 'i' indexes symbol periods of duration N chips. The despread vector $y_k(i)$ for a given code spans Q fingers. Stacking all $K_d$ despread vectors $y_k(i)$ into a single tall vector y(i) of length-$K_dQ$ results in the following symbol-level signal model:

$$y(i)=H(i)c(i)+x(i). \quad (1)$$

The length-$K_d$ symbol vector c(i) contains the transmitted symbols corresponding to the $K_d$ data codes during the i-th symbol period, i.e., the symbols of interest. The matrix H(i) is of dimension $K_dQ \times K_d$, and is a code-specific (CS) net channel response matrix that varies from symbol period to symbol period. Vector x(i) captures impairments to the transmitted symbols, including leakage into the current symbol period from desired signal codes and overhead codes in adjacent symbol periods, as well as from overhead codes in the current symbol period. Time index i references a particular symbol period.

The ($k_1,k_2$)th block (size Q×1) of this matrix is the code-specific net channel response vector given by $h_{k_1k_20}(i)$. In general, the q-th element of $h_{k_1k_2j}(i)$ for arbitrary symbol lag j is given by:

$$h_{k_1k_2j}(i; q) = \frac{1}{N}\sum_p g_p \sum_{u=1-N}^{N-1} C_{k_1k_2ij}(u)x(jNT_c + \tau_q - \tau_p - uT_c), \quad (2)$$

where $g_p$ and $\tau_p$ are the tap gain and delay of the medium channel between the transmitter and receiver, $\tau_q$ is a finger delay, $x(\tau)$ is the chip pulse autocorrelation function, and $T_c$ is the chip period. $C_{k_1k_2ij}(i)$ is the periodic cross-correlation function between the $k_1$-th spreading code during the i-th symbol period and the $k_2$-th spreading code during the (i–j)-th symbol period. Note that the net response matrix H(i) is a function of the net response vectors only at zero symbol lag, i.e., for j=0.

Each spreading code is given by the product of a channelization code (short code) and a cell-specific scrambling code known as the long code. The long code has a period equal to the duration of a radio frame (38400 chips), in contrast to the short code which has a period of N=16 chips. Because of long code scrambling, $C_{k_1k_2ij}(i)$ changes from one symbol period to the next. It is the presence of this function that is responsible for the code-specific nature of the net response matrix H(i). A corresponding code-specific quality characterizes the leakage amongst the data codes described earlier.

Figure 2:
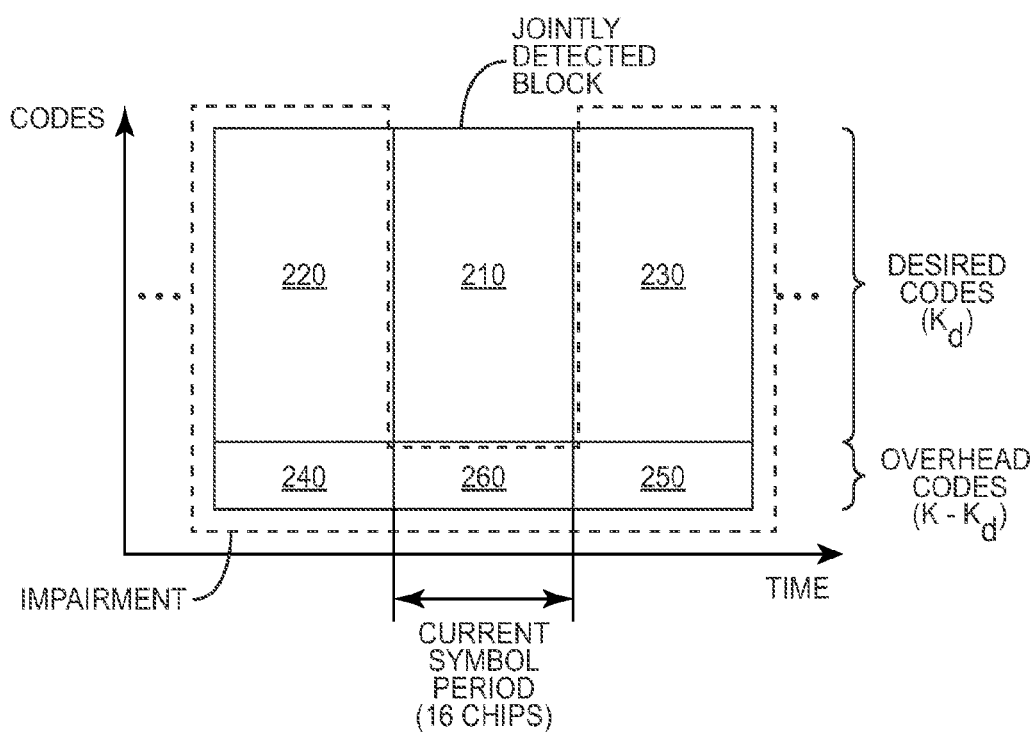
FIG. 2 illustrates sources of interference to a block of jointly detected code-separated symbols in a symbol-level joint demodulation receiver.

As noted earlier, impairment vector x(i) in Equation (1) captures impairments to the transmitted symbols, including leakage into the current symbol period from desired signal codes and overhead codes in adjacent symbol periods, as well as from overhead codes in the current symbol period. FIG. 2 illustrates a general interference scenario for a receiver that jointly demodulates a number of channels corresponding to $K_d$ desired codes, where time is given on the x-axis and code space is represented by the y-axis. The region labeled 210 represents the code space occupied by the desired channels for a current symbol period. One source of impairments to the set of desired signals in the current symbol period is inter-symbol interference from the desired channels, which can be viewed as "leakage" from the regions marked 220 and 230 on FIG. 2, which represent the desired code space at symbol times before and after the current symbol time, respectively. Additional inter-symbol interference is caused by leakage from overhead codes at symbol times before and after the current symbol time, as represented by regions 240 and 250 on FIG. 2. Finally, same-symbol-time interference to the desired signals is caused by a loss of orthogonality between the desired codes and the overhead codes; this interference can be viewed as leakage from region 260 of FIG. 2 to the desired code space represented by region 210. Note that same-symbol-time leakage between the desired codes is not viewed as an impairment in the impairment model represented by FIG. 2. Rather, this leakage among the desired codes is accounted for in the joint demodulation process.

In various embodiments of the current invention, receiver performance is improved significantly by accurately modeling the code-specific nature of one or more of the sources of impairment illustrated in FIG. 2, which in turn results in a more accurate estimate of the impairment vector x(i). This modeling is done through the use of a code-specific impairment covariance matrix:

$$R_x(i)=E[x(i)x^H(i)].$$

This matrix can be viewed as a $K_d$ by $K_d$ matrix of blocks, where each block is in turn a Q by Q matrix. The ($k_1,k_2$)-th block in this matrix captures the covariance of the impairment observed at the output of the despreaders corresponding to the $k_1$-th and $k_2$-th data codes.

Mathematically, the impairment covariance matrix $R_x(i)$ is given by $$R_x(i) = \begin{bmatrix} R_{11}(i) & R_{12}(i) & \ldots & R_{1K_d}(i) \\ R_{21}(i) & R_{22}(i) & \ldots & R_{2K_d}(i) \\ \vdots & \vdots & \ddots & \vdots \\ R_{K_d1}(i) & R_{K_d2}(i) & \ldots & R_{K_dK_d}(i) \end{bmatrix} \quad (3)$$

The ($k_1,k_2$)-th block is given by $R_{k_1k_2}(i)=E[x_{k_1}(i)x_{k_2}^H(i)]$, where $x_k(i)$ is the impairment observed at the output of the despreader corresponding to the k-th data code. In general, the off-diagonal blocks are non-zero, indicating correlation between the impairment observed at the despreader outputs corresponding to two different codes.

Figure 3:
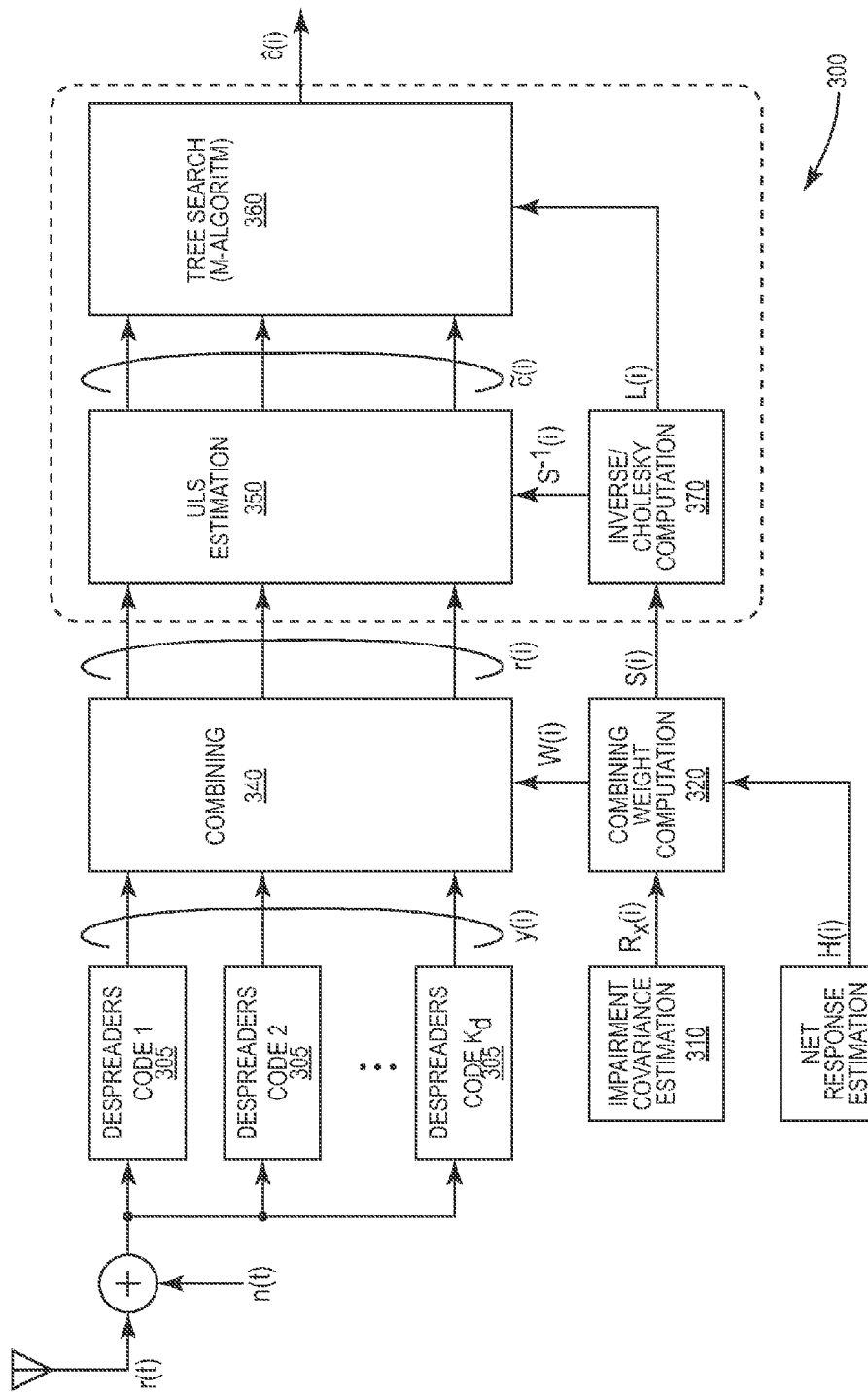
FIG. 3 illustrates an example receiver circuit according to several embodiments of the present invention.

One application of the impairment covariance matrix $R_x(i)$ is in calculating combining weights for linear equalization and interference suppression. This application is illustrated in FIG. 3, which illustrates one example of a receiver circuit 300. Receiver circuit 300 includes several groups of despreaders (correlators) 305, where each despreader group 305 is allocated to a particular one of $K_d$ signals of interest. Receiver circuit 300 further includes an impairment covariance estimation circuit 310, which is configured to calculate a covariance matrix for each symbol time, the covariance representing impairment correlations among the despreader groups 305 from sources other than the signals of interest as well as from inter-symbol interference in and among the signals of interest.

As can be seen in FIG. 3, one use of the impairment covariance matrix $R_x(i)$ provided by impairment covariance estimation circuit 310 is in computing an equalizing combining weight matrix W(i). In receiver circuit 300, this is performed by combining weight computation circuit 320, which uses impairment covariance matrix $R_x(i)$ as well as a code-specific net channel response matrix H(i) produced by net response estimator 330. As will be described in further detail below, the combining weight matrix W(i) is applied to the outputs of despreaders 305 by combiner 340, to produce an interference-reduced decision statistic vector r(i), which can be represented as:

$$r(i) = W^H(i)y(i). \quad (4)$$

The remaining components of receiver circuit 300, which include ULS estimator 350, tree searcher 360, and inverse/Cholesky computation circuit 370, represent one example of a joint demodulation circuit for estimating a desired symbol value vector ĉ(i). More generally, any of a variety of signal detection circuits and algorithms can be used to estimate a symbol value, or soft bit values, or both, for at least one of the signals of interest from the interference-reduced decision statistic vector, for the given symbol time, using a non-linear detection process that accounts for code-specific leakage between the signals of interest. Thus, it will be appreciated that the equalization process performed by combiner 340 is a linear process that suppresses inter-symbol interference and same-symbol-time interference from overhead codes to the desired codes, using a code-specific model of the impairments, while the subsequent joint demodulation of the desired codes is one example of a non-linear demodulation process that accounts for the interactions and leakage between and among the desired codes.

Impairment covariance estimation circuit 310 is at the heart of the example receiver circuit 300. It will be appreciated, however, that the covariance matrix provided by impairment covariance estimation circuit 310 may be used for purposes other than those pictured in FIG. 3. For example, the covariance matrix might be used for SINR estimation purposes. At a mobile terminal, for instance, SINR estimates may be used to generate Channel Quality Information (CQI) for feeding back to a scheduling node in the wireless network. At a radio base station, such SINR estimates may be used to drive inner loop power control.

As will be discussed in further detail below, the covariance matrix produced by impairment covariance estimation circuit 310 comprises diagonal blocks that each represent impairment correlations among a single one of the despreader groups 305. These diagonal blocks are computed from at least first terms that account in a code-specific manner for same-symbol-time interference to the desired signals from each of the interfering signals. In other words, the diagonal blocks are based on code-specific calculations that account for leakage from region 260 of FIG. 2 to region 210. Because the codes change from one symbol to the next, the resulting covariance matrix is specific to a given symbol period and is recomputed at each symbol time.

The covariance matrix produced by impairment covariance estimation circuit 310 may also include non-zero off-diagonal blocks that each represent impairment correlations between correlators from a corresponding pair of the despreader groups 305. In some embodiments, these off-diagonal blocks are also code-specific, in that they are based on terms that account in a code-specific manner for at least same-symbol-time interference from each of the interfering signals. In other words, the calculation of the off-diagonal blocks in these embodiments also account for leakage from region 260 of FIG. 2 to region 210.

The covariance matrix produced by impairment covariance estimation circuit 310 provides several advantages when used in a symbol-level joint demodulation receiver circuit like receiver circuit 300. The implementation of the symbol-level joint demodulation receiver requires computation of the equalizer weight matrix W(i), which is applied to the despread vector y(i) in a pre-processing step. For true maximum likelihood detection, the required weight matrix computation is $$W(i) = R_x^{-1}(i)H(i). \quad (5)$$

In the computation of these equalizer weights, two shortcomings of previous approaches are that the off-diagonal blocks of $R_x(i)$ are assumed to be zero and, for at least the diagonal blocks, the code-specific nature of the impairment covariance is not accurately modeled. Both of these simplifications limit receiver performance.

In contrast, in some embodiments of an impairment covariance estimation circuit according to the current invention, all diagonal and off-diagonal blocks are constructed exactly, leading to a dramatic improvement in performance in the presence of overhead. With this approach, referred to herein as the "full CS" approach, the code leakage effects from all interfering symbols are accounted for properly. In some simplified variants of these embodiments, the off-diagonal blocks are set to zero, and the code-specific nature of the diagonal blocks is approximated, but not completely averaged out. This approach is described below as the "partial CS" approach, and is attractive when it comes to inverting the covariance matrix, as is required in the weight computation. Even with this approximation, however, a performance advantage over previous techniques is achieved.

First, the full CS approach is explained. With this approach, the exact formulation for at least the diagonal blocks of the impairment covariance matrix $R_x(i)$ is used in the computation of the equalizer weights W(i). In the complete case, each block of the covariance matrix is constructed according to $$R_{k_1 k_2}(i) = \sum_{n=1}^{K} E_n \sum_{j=-\infty}^{\infty} h_{k_1 nj}(i) h_{k_2 nj}^H(i) [1 - \delta(j)\delta_{K_d}(n)] + N_o R_N \delta(k_1 - k_2), \quad (6)$$

where the function $\delta(\cdot)$ is equal to 1 only when its argument is equal to zero, and is equal to zero otherwise. Similarly, $\delta_{K_d}(n)$ is equal to 1 if n indexes one of the $K_d$ data codes, and is zero otherwise. The code-specific net response vector $h_{knj}(i)$ in this expression is the same as described above, in connection with Equation (2). Matrix $R_N$ accounts for noise and is a function of the pulse shape autocorrelation function evaluated at finger delay differences. The element $R_N$ corresponding to the ($q_1$, $q_2$)-th finger pair is:

$$R_N(q_1, q_2) = x(\tau_{q_1} - \Sigma_{q_2}). \quad (7)$$

For the purposes of equalizer weight computation, the above covariance blocks may be constructed parametrically once estimates of the medium channel response are available, i.e., the tap gains $g_p$ and tap delays $\tau_p$. It is also necessary to estimate the scaling factors $E_n$ (per-code symbol energy) and $N_o$ (noise level) which may be accomplished using well-known techniques. All other quantities are known to the receiver.

In a simplified version of the full CS approach, the off-diagonal blocks of $R_x(i)$ may be set to zero, thus requiring less computational effort in constructing and inverting $R_x(i)$. Even with this approximation, the diagonal blocks $R_{kk}(i)$ remain code-specific quantities, thus capturing enough of the CS structure of the impairment to still result in good performance.

Another simplified approach that achieves a very attractive trade-off between performance and complexity is the partial CS approach. With this approach, the impairment covariance matrix formulation consists of a mix of code-specific and code-averaged terms. The idea behind this formulation is to model all signal components corresponding to the desired symbol period (symbol lag j=0) as code-specific quantities, and all others (symbol lags j≠0) as code-averaged quantities. The rationale underlying this approach is that for moderately dispersive channels with a maximum delay (in chip periods) less than the spreading factor N, most of the code leakage occurs between codes during the symbol period of interest rather than from adjacent symbol periods. Hence it makes sense to perform detailed interference modeling through code-specific processing for the dominant source of interference.

This may be visualized by referring once again to FIG. 2. The desired signal component (region 210) is already modeled as code-specific by necessity, since these signals are to be jointly demodulated. The remaining signals during the current symbol period are the overhead signals (region 260). The interference from these signals is modeled as a code-specific quantity within the impairment covariance matrix. The interference from the remaining blocks (regions 220, 230, 240, and 250) is modeled as a code-averaged quantity in the impairment covariance matrix.

With the partial CS approach, the blocks of the covariance matrix can be constructed according to:

$$R_{k_1 k_2}(i) = \begin{cases} \sum_{n=K_d+1}^{K} E_n h_{k_1 n 0}(i) h_{k_2 n 0}^H(i) + \\ \quad E_c(R_I - R_C^{(k_1,k_2)}) + N_o R_N, \quad k_1 = k_2 \\ \sum_{n=K_d+1}^{K} E_n h_{k_1 n 0}(i) h_{k_2 n 0}^H(i) - E_c R_C^{(k_1,k_2)}, \quad k_1 \neq k_2. \end{cases} \quad (8)$$

In this expression, the only code-specific terms are the ones involving the net response vectors $h_{kn0}(i)$, and these correspond to the overhead codes only ($k=K_d+1 \ldots K$), during the current symbol period (symbol lag j=0). These terms thus account in a code-specific manner for interference to the desired signals from region 260 of FIG. 2. One attractive feature of this formulation is that the code-specific portion consists of a sum of rank-1 terms. This fact is exploited in a further simplified approach discussed below.

The other terms in the above expression are code-averaged and can therefore be computed at longer intervals, such as once per slot, rather than at every symbol period. The code averaged terms $R_I$ and $R_N$ are well-known quantities that are used in the construction of the impairment covariance matrix for the conventional G-Rake receiver (no joint detection). (See, for example, G. E. Bottomley et al., "A Generalized RAKE Receiver for Interference Suppression," IEEE Journal on Selected Areas of Communication, vol. 18, pp. 1536-1545, August 2000.) The elements of the former, by example, are given by:

$$R_I(q_1, q_2) = \sum_{p_1} \sum_{p_2} g_{p_1} g_{p_2}^* \sum_{\substack{u=-\infty \\ u \neq 0}}^{\infty} x(\tau_{q_1} - \tau_{p_1} - uT_c) x^*(\tau_{q_2} - \tau_{p_2} - uT_c). \quad (9)$$

The code averaged term $R_C^{(k_1,k_2)}$ in Equation (8) is a "correction" term that accounts for the fact that the $K_d$ symbols that are jointly detected should not be included in the impairment. The elements of this correction term are given by:

$$R_C^{(k_1,k_2)}(q_1, q_2) = \sum_{p_1} \sum_{p_2} g_{p_1} g_{p_2}^* \sum_{\substack{u=1-N \\ u \neq 0}}^{N-1} \left(\frac{\Phi_{k_1 k_2}(u)}{N}\right) x(\tau_{q_1} - \tau_{p_1} - uT_c) x^*(\tau_{q_2} - \tau_{p_2} - uT_c), \quad (10)$$

where:

$$\Phi_{k_1 k_2}(u) = \begin{cases} \sum_{m=0}^{N-1-u} b_{k_1}^*(m) b_{k_2}(m), & u > 0 \\ \sum_{m=-u}^{N-1} b_{k_1}^*(m) b_{k_2}(m), & u < 0. \end{cases} \quad (11)$$

In this function, $b_k(m)$ is the chip sequence of the k-th channelization code (short code). Note that the short codes do not vary from one symbol period to the next; hence, $\Phi_{k_1 k_2}(u)$ is time invariant.

As was the case with the full CS approach, the off-diagonal blocks of $R_x(i)$ may be set to zero in a variant of the partial CS approach, thus requiring less computational effort in constructing $R_x(i)$. Even with this approximation, the diagonal blocks $R_{kk}(i)$ remain code-specific quantities, thus capturing enough of the code-specific structure of the impairment to result in still good performance. This simplified approach is attractive since $R_x(i)$ becomes block-diagonal; hence, the inverse $R_x^{-1}(i)$ may be computed on a block-by-block basis, either serially or in parallel. Moreover, the inverse of each block may be computed efficiently by exploiting the structure of the code-specific portion of $R_{kk}(i)$. As mentioned above, the code-specific portion consists of a sum of rank-1 terms. Hence, an iterative update procedure based on the use of the matrix inversion lemma may be adopted. Rather than inverting each block $R_{kk}(i)$ every symbol period, the inverse of the code-averaged portion need be computed only once. Then, simple updates to this may be added at each symbol period, based on a number of simple matrix-vector computations involving the code-specific net channel response vectors. Such an iterative update procedure exploits the well-known matrix inversion lemma applied a number of times. The number of iterations is equal to the number of overhead codes, $K-K_d$.

In the preceding discussion, two main approaches to producing an impairment covariance matrix were presented, as well as simplifications thereof. These approaches result in the construction of an impairment covariance matrix $R_x(i)$, which can be used for, among other things, computing an equalizer weight matrix $W(i)=R_x^{-1}(i)H(i)$ for use in a joint demodulation receiver such as the receiver circuit 300 pictured in FIG. 3. As previously mentioned, the weight matrix arises as a consequence of employing maximum likelihood detection (joint detection) of the $K_d$ data symbols. Exemplary operation of a joint detection receiver is described in the following discussion.

First, referring back to FIG. 3, the output of combining circuit 340, which acts as a linear equalizer, is given by the length-$K_d$ decision statistic vector:

$$r(i) = W^H(i)y(i) \quad (12a)$$
$$= S(i)c(i) + z(i),$$

where:

$$S(i) = W^H(i)H(i) \quad (12b)$$
$$= H^H(i)R_x^{-1}(i)H(i).$$

The covariance of the combined impairment $z(i)=W^H(i)x(i)$ is simply $R_x(i)$.

The joint detection process requires computation of a joint-detection metric over a subset of hypotheses of the desired symbol vector $c(i)$. The symbol vector corresponding to the "best" metric is then selected as the solution to the joint detection problem. The total number of hypotheses is exponential in the number of data codes $K_d$. For example, with 16-QAM modulation, the number of hypotheses is $16^{K_d}$. This can be a very large number, which motivates using reduced search approaches to implement the joint detection.

Using well known approaches for formulating the metric, such as those given in Yong and Willink, "Iterative tree search detection for MIMO wireless systems," IEEE Transactions on Communications, vol. 53, pp. 930-935, June 2005, the joint detection metric may be written in the following useful form:

$$\mu(c) = \sum_{k=1}^{K_d} \lambda_k(c), \quad (14)$$

where the branch metric is given by:

$$\lambda_k(c) = \left| \sum_{n=1}^{k} l_{kn}(i)[c_n - \tilde{c}_n(i)] \right|^2. \quad (15)$$

Here, $l_{kn}(i)$ is an element of the Cholesky factor $L(i)$ of the "S" matrix $S(i)$, where:

$$S(i)=L^H(i)L(i), \quad (16)$$

and $\tilde{c}_n(i)$ is an element of the unconstrained least squares estimate $\tilde{c}(i)$ given by:

$$\tilde{c}(i)=S^{-1}(i)r(i). \quad (17)$$

Writing the metric in this form enables any number of tree search approaches to be used to enable the joint detection. The most complex option, with complexity exponential in $K_d$, is to perform a full search over all hypotheses. This yields the maximum likelihood solution, but is prohibitively complex in most circumstances. Popular reduced-complexity approaches which search only a portion of the tree are: the m-algorithm, described in the Yong and Willink article referenced above; sphere decoding, described in Damen et al., "On maximum-likelihood detection and the search for the closest lattice point," IEEE Transactions on Information Theory, vol. 49, pp. 2389-2402, October 2003; geometric decoding, described in Samuel and Fitz, "Geometric decoding of PAM and QAM lattices, in Proc. IEEE Globecom '07, Washington, D.C., pp. 4247-4252, November 2007; and a technique called assisted maximum-likelihood detection (AMLD), which is a multi-stage group detection (MSGD) search described in the '767 Publication incorporated herein by reference above. Any of these approaches may benefit from the enhanced modelling of the impairment described herein.

Referring once again to the example receiver architecture illustrated in FIG. 3, a summary of receiver operations making use of the accurate modelling of the code-specific impairment covariance matrix $R_x(i)$ disclosed herein follows. An example sequence of operations is as follows:

First, $K_d$ codes of interest are despread, using despreaders (correlators) 305 to generate the despread vector $y(i)$. Next, the code-specific net response matrix $H(i)$ is calculated by net response estimation circuit (330) using, for example, the expression for the constituent net response vectors shown in Equation (2). Then, impairment covariance estimation circuit 310 constructs the impairment covariance matrix $R_x(i)$ using, for example, either Equations (3) and (6), for the full CS embodiment, or Equations (3) and (8), for the partial CS embodiment.

Next, combining weight computation circuit 320 computes the combining weight matrix $W(i)$ using Equation (5). The combining weight matrix $W(i)$ is used by combining circuit 340 to combine the despread values $y(i)$ to generate the combined vector $r(i)$, according to Equation (12a). Next, the "S" matrix $S(i)$ is computed according to Equation (12b) using, for example, combining weight computation circuit 320.

Based on the combined vector $r(i)$, the "S" matrix $S(i)$, and the impairment covariance matrix $R_x(i)$, any suitable reduced-complexity tree search approach may be applied to jointly detect the $K_d$ desired symbols, including the m-algorithm, sphere decoding, and geometric decoding approaches mentioned earlier. As an example, the portion of the receiver circuit 300 within the dashed box in FIG. 3 shows those operations that are required to implement the m-algorithm. The required sequence of operations in this case is as follows.

First, inverse/Cholesky computation circuit 370 computes the Cholesky decomposition of $S(i)$, as in Equation (16). Next, unconstrained least-squares (ULS) estimator 350 computes the unconstrained least squares estimate $\tilde{c}(i)$ of the desired symbol vector according to Equation (17). Finally, tree-searcher 360 performs a tree search using the m-algorithm, based on the path metric $\mu(c)$ computed according to Equations (14) and (15).

As will be readily understood by those familiar with communications receiver design, the several functional blocks of receiver circuit 300, as well as corresponding functions in other receiver circuits using the inventive techniques described herein, may be implemented using digital logic and/or one or more microcontrollers, microprocessors, or other digital hardware. In some embodiments, several or all of the various functions of receiver circuit 300 may be implemented together, such as in a single application-specific integrated circuit (ASIC), or in two or more separate devices with appropriate hardware and/or software interfaces between them. Several of the functional blocks of receiver circuit 300, including impairment covariance estimation circuit 310, may be implemented on a processor shared with other functional components of a mobile terminal, for example.

Alternatively, several of the functional elements of the receiver processing circuits discussed above may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

Figure 4:
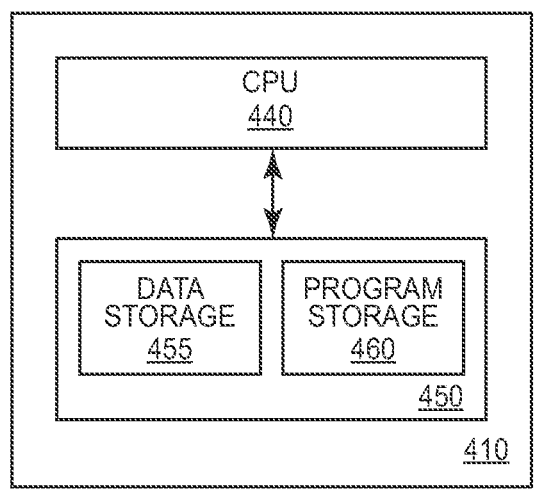
FIG. 4 is a block diagram illustrating components of an example processing circuit according to some embodiments of the present invention.

FIG. 4 illustrates one example of a processing circuit 410 adapted to carry out the functions of one or more of the functional blocks of receiver circuit 300, such as impairment covariance estimation circuit 310. Processing circuit 410 includes a central-processing unit (CPU) 440, which may comprise one or more microprocessors, microcontrollers, and/or the like, coupled to memory unit 450. Memory unit 450, which may comprise one or several types of memory such as RAM, ROM, Flash, optical storage devices, magnetic storage devices, and the like, stores computer program instructions 460 for execution by CPU 440, and stores program data 455. Program instructions 460 include instructions for carrying out one or more of the techniques described above. In particular, program instructions 460 may include, in several embodiments, computer program instructions for calculating a covariance matrix for a given symbol time, using one of the detailed techniques described above or variants thereof. Thus, the combination of CPU 440 with memory 450 forms a circuit configured to calculate a covariance matrix according to the full CS approach or partial CS approach, as described above, or according to variants of those approaches.

The processing circuit 410 of FIG. 4 may be further configured, in some embodiments, to carry out some or all of the functions of one or more of the other functional blocks of FIG. 3, such as net response estimation circuit 330, combining weight computation circuit 320, and so on. In some cases some or all of these functions may be carried out on separate processing circuits, which may or may not have similar structures. It will be appreciated, of course, that several of the functions of receiver circuit 300 may be better suited for implementation in specialized digital hardware. For example, hardware implementations of high-speed correlator arrays suitable for implementing despreaders 305 are well known.

Figure 5:
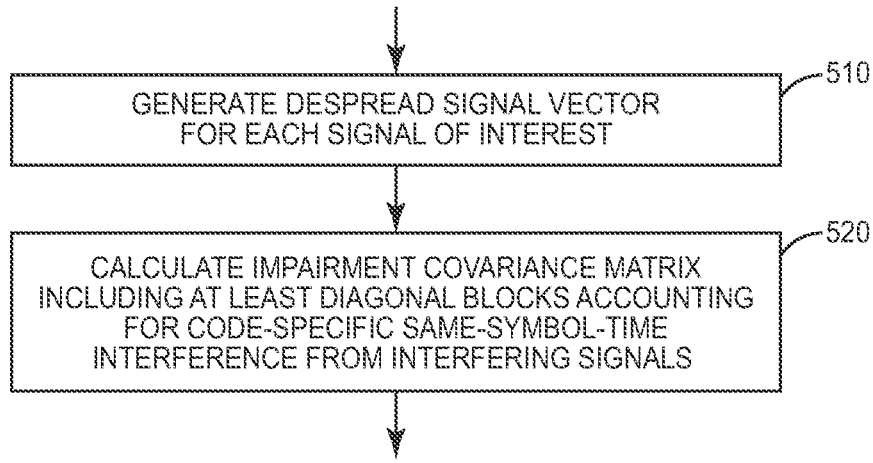
FIG. 5 is a process flow diagram illustrating an example method for processing received spread spectrum signals containing two or more signals of interest and one or more interfering signals.

Those skilled in the art will appreciate that a receiver circuit that includes an impairment covariance estimation circuit of the sort described above, coupled to a bank of correlators like despreaders 305 and provided with code-specific net channel response estimates, can produce an accurate, code-specific model of impairments to a group of desired code-separated signals, including impairments caused by one or more interfering (overhead) signals and by inter-symbol interference from the desired signals themselves. FIG. 5 illustrates an example method for implementation by such a receiver circuit.

The illustrated method begins, as shown at block 510, with the generation of a despread signal vector for each signal of interest, for a given symbol time, using a circuit comprising a corresponding group of correlators for each of the signals of interest. While the detailed discussion of an HSPA-related solution generally assumed that the signals of interest included all of the high-speed downlink shared channel codes, that is not necessarily the case. A multi-pass receiver process may be used, for example, in which only a subset of the signals targeted to the receiver are included among the signals of interest in a particular pass, with the remaining data signals treated as overhead, i.e., interference, with respect to the joint demodulation of the signals of interest.

The method of FIG. 5 continues, as shown at block 520, with the calculating of a covariance matrix for the given symbol time. This covariance matrix represents impairment correlations among the correlators from sources other than the signals of interest, as well as from inter-symbol interference in and among the signals of interest. In particular, the covariance matrix includes diagonal blocks that each represent impairment correlations among a single one of the groups of correlators. In each of several embodiments, these diagonal blocks are calculated based on first terms that account in a code-specific manner for same-symbol-time interference from each of the interfering signals.

In some embodiments, the calculation of the covariance matrix, for at least the diagonal blocks, is based further on second terms that account in a code-specific manner for inter-symbol interference from each of the interfering signals. In some of these embodiments, these second terms further account in a code-specific manner for inter-symbol impairments from among the signals of interest. In other embodiments, the calculating of at least the diagonal blocks is further based instead on second terms that account in a code-averaged manner for inter-symbol interference from the interfering signals and from among the signals of interest.

In a variant of any of the above embodiments, the calculation of the covariance matrix further comprises computing a plurality of off-diagonal blocks of the impairment covariance matrix, wherein each off-diagonal block represents impairment correlations between correlators from a corresponding pair of the groups of correlators, and wherein said computing of the off-diagonal blocks is based on terms that account in a code-specific manner for same-symbol-time interference from each of the interfering signals.

Figure 6:
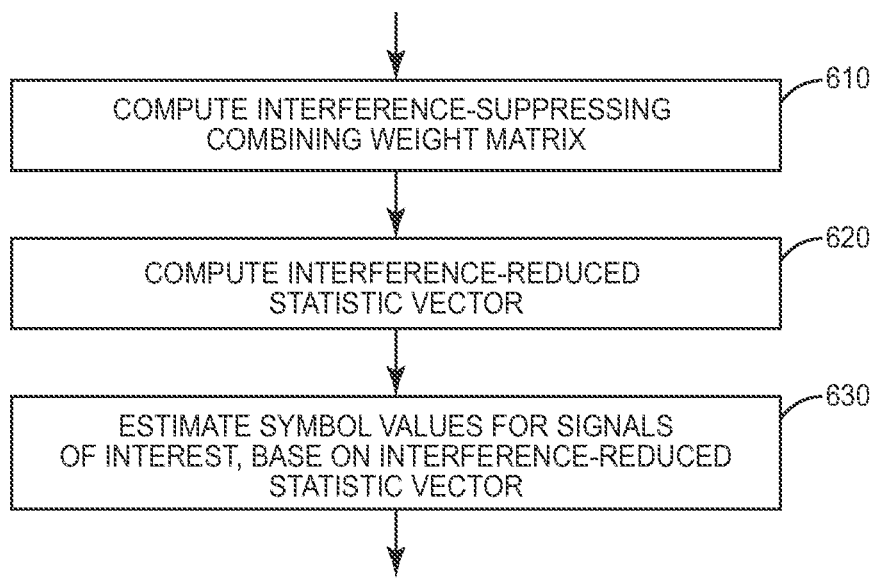
FIG. 6 is another process flow diagram illustrating an example method for processing received spread spectrum signals containing two or more signals of interest and one or more interfering signals

In several embodiments of the present invention, the techniques described above and illustrated generally in FIG. 5 are combined with other receiver functions to provide improved receiver performance. FIG. 6 illustrates generally a receiver process that can be combined with the process illustrated in FIG. 5.

As shown at block 610 of FIG. 6, an interference-suppressing combining weight matrix is computed, using the covariance matrix and a code-specific channel response matrix. Next, as shown at block 620, the combining weight matrix is applied to the despread signal vector, to yield an an interference-reduced decision statistic vector for the given symbol time. The interference-reduced decision statistic vector computed in this operation comprises a single complex value for each of the signals of interest. Finally, as shown at block 630, a symbol value, or soft bit values, or both, are estimated for at least one of the signals of interest from the interference-reduced decision statistic vector, for the given symbol time, using a non-linear detection process that accounts for code-specific leakage between the signals of interest.

Any of a variety of non-linear processes can be used to estimate the desired signals, including joint demodulation techniques, parallel interference cancellation techniques, etc. In some embodiments, for example, the estimating of the desired signal symbols begins with the computing of an unconstrained least-squares estimate of a desired symbol vector for the signals of interest, for the given symbol time, based on the reduced-interference decision statistic vector. A tree search is then performed, to jointly detect symbols for the signals of interest. In some of these embodiments, the tree search is a breadth-first constrained tree search, or a depth-first constrained tree search, or a combination of both. Examples include a reduced complexity tree search approach selected from a group consisting of: an m-algorithm search; a sphere-decoding search; a geometric-decoding search; and a multi-stage group detection (MSGD) search.

Embodiments of the present invention further include receiver circuits configured to carry out one or more of the methods described above. The receiver circuit 300 illustrated in FIG. 3 is one example of such a receiver circuit. More generally, a receiver circuit according to several embodiments of the invention includes a despreading circuit, which in turn includes a group of correlators for each of the signals of interest, where each group of correlators is configured to generate a despread signal vector for a corresponding signal of interest, for a given symbol time. The receiver circuit further includes an impairment covariance estimation circuit configured to calculate a covariance matrix for the given symbol time, the covariance matrix representing impairment correlations among the correlators from sources other than the signals of interest as well as from inter-symbol interference in and among the signals of interest. As discussed in detail above, the covariance matrix computed by the impairment covariance estimation circuit comprises diagonal blocks that each represent impairment correlations among a single one of the groups of correlators. The impairment covariance estimation circuit is configured to calculate at least the diagonal blocks of the covariance matrix based on first terms that account in a code-specific manner for same-symbol-time interference to the desired signals from each of the interfering signals.

In some embodiments, the impairment covariance estimation circuit in a receiver as described above is configured to calculate at least the diagonal blocks based further on second terms that account in a code-specific manner for inter-symbol interference from each of the interfering signals. In some cases, these second terms further account in a code-specific manner for inter-symbol impairments from among the signals of interest. Alternatively, in some embodiments the impairment covariance estimation circuit is configured to calculate at least the diagonal blocks based further on second terms that account in a code-averaged manner for inter-symbol interference from the interfering signals and from among the signals of interest.

While some embodiments are configured to simplify the calculations by setting off-diagonal blocks of the impairment covariance matrix to zero, the impairment covariance estimation is configured to calculate a plurality of off-diagonal blocks of the impairment covariance matrix, wherein each off-diagonal block represents impairment correlations between correlators from a corresponding pair of the groups of correlators. The impairment covariance estimation circuit in these embodiments is configured to calculate the off-diagonal blocks based on terms that account in a code-specific manner for same-symbol-time interference from each of the interfering signals.

As can be seen in the example receiver circuit 300 pictured in FIG. 3, the impairment covariance estimation circuit and despreading circuit described above can be combined with other receiver circuits to provide improved receiver performance. In some embodiments, for example, a receiver circuit that includes an impairment covariance estimation circuit and despreading circuit as detailed above further includes a combining weight computation circuit configured to compute an interference-suppressing combining weight matrix based on the covariance matrix and a code-specific channel response matrix, as well as an equalizing combiner circuit configured to compute an interference-reduced decision statistic vector for the given symbol time from the combining weight matrix and the despread signal vectors. The interference-reduced decision statistic vector produced by the combiner circuit comprises a single complex value for each of the signals of interest for the given symbol time. The receiver circuit in several of these embodiments still further includes a signal detection circuit configured to estimate a symbol value, or soft bit values, or both, for at least one of the signals of interest from the interference-reduced decision statistic vector, for the given symbol time, using a non-linear detection process that accounts for code-specific leakage between the signals of interest.

In some of these embodiments, the signal detection circuit is configured to compute an unconstrained least-squares estimate of a desired symbol vector for the signals of interest, for the given symbol time, based on the reduced-interference decision statistic vector, and perform a tree search to jointly detect symbols for the signals of interest. In various cases the tree search is a breadth-first constrained tree search, or a depth-first constrained tree search, or a combination of both. The tree search may be, for example, a reduced complexity tree search approach, such as an m-algorithm search, a sphere-decoding search, a geometric-decoding search, or a multi-stage group detection (MSGD) search.

As will be appreciated by those familiar with the design of advanced communications receivers, the methods and circuits described above can provide improved demodulation performance compared to prior techniques, especially in the presence of interference from overhead channels. The improved performance is due directly to the more accurate modeling of the impairment both within and between the data/overhead codes. The improved demodulation performance translates directly into improved data rates and/or throughput for the users of communication devices configured according to these techniques.

It will also be appreciated that the foregoing description and the accompanying drawings represent non-limiting examples of the methods and apparatus taught herein for process received spread spectrum signals containing two or more signals of interest and one or more interfering signals with known spreading codes, whether or not the received signal is an HSPA signal. As such, the inventive apparatus and techniques taught herein are not limited by the foregoing description and accompanying drawings. Instead, the present invention is limited only by the following claims and their legal equivalents.

What is claimed is:

1. A receiver circuit for processing a received spread spectrum signal containing two or more signals of interest and one or more interfering signals with known spreading codes, said receiver circuit comprising:
   a despreading circuit including a group of correlators for each of the signals of interest, wherein each group of correlators is configured to generate a despread signal vector for a corresponding signal of interest, for a given symbol time; and
   an impairment covariance estimation circuit configured to calculate a covariance matrix for the given symbol time, the covariance matrix representing impairment correlations among the correlators from sources other than the signals of interest as well as from inter-symbol interference in and among the signals of interest, wherein the covariance matrix comprises diagonal blocks that each represent impairment correlations among a single one of the groups of correlators and wherein said impairment covariance estimation circuit is configured to calculate said diagonal blocks based on first terms that account in a code-specific manner for same-symbol-time interference from each of the interfering signals.

2. The receiver circuit of claim 1, further comprising:
   a combining weight computation circuit configured to compute an interference-suppressing combining weight matrix based on the covariance matrix and a code-specific channel response matrix;
   an equalizing combiner circuit configured to compute an interference-reduced decision statistic vector for the given symbol time from the combining weight matrix and the despread signal vectors, the interference-reduced decision statistic vector comprising a single complex value for each of the signals of interest; and a signal detection circuit configured to estimate a symbol value, or soft bit values, or both, for at least one of the signals of interest from the interference-reduced decision statistic vector, for the given symbol time, using a non-linear detection process that accounts for code-specific leakage between the signals of interest.

3. The receiver circuit of claim 1, wherein the impairment covariance estimation circuit is configured to calculate said diagonal blocks based further on second terms that account in a code-specific manner for inter-symbol interference from each of the interfering signals.

4. The receiver circuit of claim 3, wherein said second terms further account in a code-specific manner for inter-symbol impairments from among the signals of interest.

5. The receiver circuit of claim 1, wherein the impairment covariance estimation circuit is configured to calculate said diagonal blocks based further on second terms that account in a code-averaged manner for inter-symbol interference from the interfering signals and from among the signals of interest.

6. The receiver circuit of claim 1, wherein the impairment covariance estimation circuit is further configured to calculate a plurality of off-diagonal blocks of the impairment covariance matrix, wherein each off-diagonal block represents impairment correlations between correlators from a corresponding pair of the groups of correlators, and wherein said impairment covariance estimation circuit is configured to calculate said off-diagonal blocks based on at least second terms that account in a code-specific manner for same-symbol-time interference from each of the interfering signals.

7. The receiver circuit of claim 2, wherein the signal detection circuit is configured to:
  compute an unconstrained least-squares estimate of a desired symbol vector for the signals of interest, for the given symbol time, based on the reduced-interference decision statistic vector; and
  perform a tree search to jointly detect symbols for the signals of interest.

8. The receiver circuit of claim 7, wherein said tree search is a breadth-first constrained tree search, or a depth-first constrained tree search, or a combination of both.

9. The receiver circuit of claim 7, wherein said tree search is a reduced complexity tree search approach selected from a group consisting of:
  an m-algorithm search;
  a sphere-decoding search;
  a geometric-decoding search; and
  a multi-stage group detection (MSGD) search.

10. A method, in a signal receiver, for processing a received spread spectrum signal containing two or more signals of interest and one or more interfering signals with known spreading codes, said method comprising:
  generating a despread signal vector for each signal of interest, for a given symbol time, using a circuit comprising a corresponding group of correlators for each of the signals of interest; and
  calculating a covariance matrix for the given symbol time, the covariance matrix representing impairment correlations among the correlators from sources other than the signals of interest as well as from inter-symbol interference in and among the signals of interest, wherein the covariance matrix comprises diagonal blocks that each represent impairment correlations among a single one of the groups of correlators, and wherein said calculating comprises computing said diagonal blocks based on first terms that account in a code-specific manner for same-symbol-time interference from each of the interfering signals.

11. The method of claim 10, further comprising:
  computing an interference-suppressing combining weight matrix based on the covariance matrix and a code-specific channel response matrix;
  computing an interference-reduced decision statistic vector for the given symbol time from the combining weight matrix and the despread signal vector, the interference-reduced decision statistic vector comprising a single complex value for each of the signals of interest; and
  estimating a symbol value, or soft bit values, or both, for at least one of the signals of interest from the interference-reduced decision statistic vector, for the given symbol time, using a non-linear detection process that accounts for code-specific leakage between the signals of interest.

12. The method of claim 10, wherein calculating said diagonal blocks is based further on second terms that account in a code-specific manner for inter-symbol interference from each of the interfering signals.

13. The method of claim 12, wherein said second terms further account in a code-specific manner for inter-symbol impairments from among the signals of interest.

14. The method of claim 10, wherein calculating said diagonal blocks is based further on second terms that account in a code-averaged manner for inter-symbol interference from the interfering signals and from among the signals of interest.

15. The method of claim 10, wherein calculating the covariance matrix further comprises computing a plurality of off-diagonal blocks of the impairment covariance matrix, wherein each off-diagonal block represents impairment correlations between correlators from a corresponding pair of the groups of correlators, and wherein said computing of the off-diagonal blocks is based on at least second terms that account in a code-specific manner for same-symbol-time interference from each of the interfering signals.

16. The method of claim 11, wherein said estimating comprises:
  computing an unconstrained least-squares estimate of a desired symbol vector for the signals of interest, for the given symbol time, based on the reduced-interference decision statistic vector; and
  performing a tree search to jointly detect symbols for the signals of interest.

17. The method of claim 16, wherein said tree search is a breadth-first constrained tree search, or a depth-first constrained tree search, or a combination of both.

18. The method of claim 16, wherein said tree search is a reduced complexity tree search approach selected from a group consisting of:
  an m-algorithm search;
  a sphere-decoding search;
  a geometric-decoding search; and
  a multi-stage group detection (MSGD) search.

* * * * *